Oct. 21, 1952 G. F. ROGERS 2,615,089

KEYED AUTOMATIC GAIN CONTROL SYSTEM

Filed Dec. 18, 1948

INVENTOR
Gordon F. Rogers
BY [signature]
ATTORNEY

Patented Oct. 21, 1952 2,615,089

UNITED STATES PATENT OFFICE 2,615,089

KEYED AUTOMATIC GAIN CONTROL SYSTEM

Gordon F. Rogers, New Hyde Park, N. Y., assignor to Radio Corporation of America, a corporation of Delaware Application December 18, 1948, Serial No. 66,054

1 Claim. (Cl. 178—7.5)

The present invention relates to a keyed form of automatic gain control system for use in radio receiving circuits and is concerned more directly with a keyed automatic gain control system for television receivers.

The automatic gain control system of the present invention has extreme simplicity and consequent economy among its major advantages. For instance, in its application to television receivers, one embodiment of the present invention contemplates the use of only one vacuum tube which is connected for rectification of timing pulses derived from the beam deflection circuits of the television receiver. The received television signal is then applied to the grid of this tube to control the magnitude of rectified current conducted by the tube. The current representing the rectified keying pulses is then used to establish a voltage drop across a load resistance which voltage drop is directly utilized to control the gain of the television receiver signal amplifiers.

It is commonly known that automatic gain control circuits for use in television receiving equipment differ greatly from the more frequently encountered automatic gain control circuit embodied in receivers for sound broadcast signals. In the instance of the usual broadcast receiver designed for the reception of amplitude modulated carriers, it is deemed adequate that the automatic gain control potential be produced by electrical information gleaned from the average carrier intensity of the received radio signal. Clearly, such an automatic gain control circuit would not be satisfactory for controlling the gain of television receiver video channels as the average signal strength of the radio frequency carrier is a function of the average image or picture brilliance sometimes referred to as "background level." As is well known to those skilled in the art to which the invention pertains, development of an automatic gain control voltage in accordance with the average signal strength of the received television radio carrier would cause the gain to be changed not only in accordance with the signal intensity variations of the received radio carrier due to undesirable fading or other atmospherical phenomena, but also in accordance with average picture brilliance of the image being transmitted.

Radio transmitted "negative modulated" television signals normally include blanking pulses or black level information which data is transmitted between each image line in combination with the line synchronizing pulse. This line sync pulse is most commonly superimposed upon the black level signal and these data are transmitted at some respectively predetermined constant but different carrier levels. In common television practice, the sync pulse is transmitted at maximum carrier intensity, or 100 percent carrier amplitude, while the black level or blanking pulse is transmitted at approximately 75 percent of the full carrier amplitude. The blanking impulse or black level signal in accordance with R. M. A. television synchronizing waveform standards is of the order of 16 to 18 percent of a line interval with the sync impulse having a period of approximately 8 percent of a line interval. Sync impulses when superimposed upon the blanking or black level signals are stationed between the extremities of the blanking interval so as to form what is commonly termed the "front porch" and the "back porch" on the pedestal-like structure formed by the combined sync signal and blanking impulse. The front porch interval is approximately 2 percent of the line interval and represents the time between the leading edge of each black level signal and the leading edge of the line sync pulse, whereas, the back porch interval of approximately 6 percent of a line interval, is equivalent to the time interval between the end of the line sync pulse and the termination of the black level or blank-out signal.

The amplitude of the radio frequency carrier as previously brought out is held constant during the transmission of all blanking and sync impulse information. During the transmission of image intelligence of the television signal, that is, during each line interval between successive blanking signals, the average amplitude of the transmitted radio frequency carrier is a function of the average light contained in the television image. Accordingly, if the reproduced image is to be predominantly dark, the average carrier amplitude will necessarily be greater than would be the case if the background level of the image were considerably lighter, such action of course is true only in the negative system of transmission wherein white picture information is transmitted at a lower carrier level than black-level information. It is expedient, in order that the control of the gain of the receiver be in accordance with the proper aspects of the carrier, that the automatic gain control potential be developed such that its magnitude is a function of the intensity of the receiver carrier of the television signal during the blanking or sync intervals only, and as hereinbefore brought out, not during the transmission of the picture or line information.

Since the blanking and more particularly the sync signals are transmitted at greater radio frequency intensity than image line information, it has been the general practice in television receivers to utilize some form of a peak rectifier which responds to those peak pulses of energy represented by the blanking and synchronizing signals during the synchronizing intervals. An automatic gain control system of this type is satisfactory to a degree so long as extraneous signals are not received in sufficient intensity to cause the peak rectifier to respond to this undesirable signal energy. In such arrangement, if there is considerable noise picked up at the receiver the noise signal, as such, especially if it has an amplitude which produces total signal excursions in excess of the received carrier during the synchronizing intervals, will cause the peak detector to produce an abnormal increase in rectifier energy and therefore produce abnormal increase in automatic gain control potential which results in a generally undesirable reduction of the receiver sensitivity as a result of such noise. This, of course, interferes with the proper operation of the receiver and produces fluctuations of the reproduced image brightness with possible periods following the noise bursts during which inadequate synchronizing information is applied to the synchronizing circuits due to an abnormally high reduction in receiver gain. This latter effect may tend to produce "tearing out" or other destructive "disturbances" in the reproduced image. Furthermore, in such systems the automatic gain control potential that is developed by each successive sync or blanking signal is generally stored on a condenser or applied to a circuit having a time constant where, as pointed out hereinabove, delay action may obtain such that the automatic gain control potential is, for all practical purposes, maintained constant throughout one or more succeeding field intervals regardless of changes in signal strength. Due to the operation of the peak detector and the presence of this time delay circuit, such a circuit may also respond rapidly to high intensity noise pulses but not allow the receiver to recover as quickly from the effects of noise as it responded to the noise, with the result that proper gain of the video channel is not reestablished until after an interval corresponding to many image lines has elapsed.

In the presence of considerable noise such automatic gain control circuits are not therefore entirely satisfactory since they respond to noise pulses as well as sync impulses and in so doing are slow to recover from sporadic increased energy effects represented by the additional noise.

It is well known that some of the above disadvantages of peak detector systems may be overcome by keyed types of AGC arrangements wherein the intensity of the received signal is sampled only during predetermined intervals corresponding to the occurrence of timing pulses usually held in synchronism with the received television blanking signals. The developed AGC control potential derived from this keyed sampling arrangement is then virtually noise free and by controlling the phase of the timing signals relative to the incoming television signal, the gain control system may be made to operate either from the black level or synchronizing level of the composite television signal. In an application by Karl R. Wendt, (RCA D. 23,159), Serial No. 731,139, filed February 26, 1947, entitled "Automatic Gain Control System," an inverted form of automatic gain control system is presented which provides further advantage in keyed forms of automatic gain control systems.

It is a purpose of the present invention to provide an improved automatic gain control circuit which is simple in operation and finds particular application in television receiving equipment.

It is another purpose of the present invention to provide a television receiver automatic gain control system sensitive and precise in operation yet requiring a minimum of component circuit parameters.

The invention possesses numerous other objects and features of advantage, some of which together with the foregoing will be set forth in the following description of apparatus embodying and utilizing the invention. It is therefore to be understood that the present invention is applicable to other apparatus and that it is in no way limited to the apparatus shown herein as other advantageous embodiments in accordance with its novel features as set forth in the appended claims will occur to those skilled in the art after having benefited from the teachings of the following description taken in connection with the accompanying drawings in which:

Figures 1, 2:
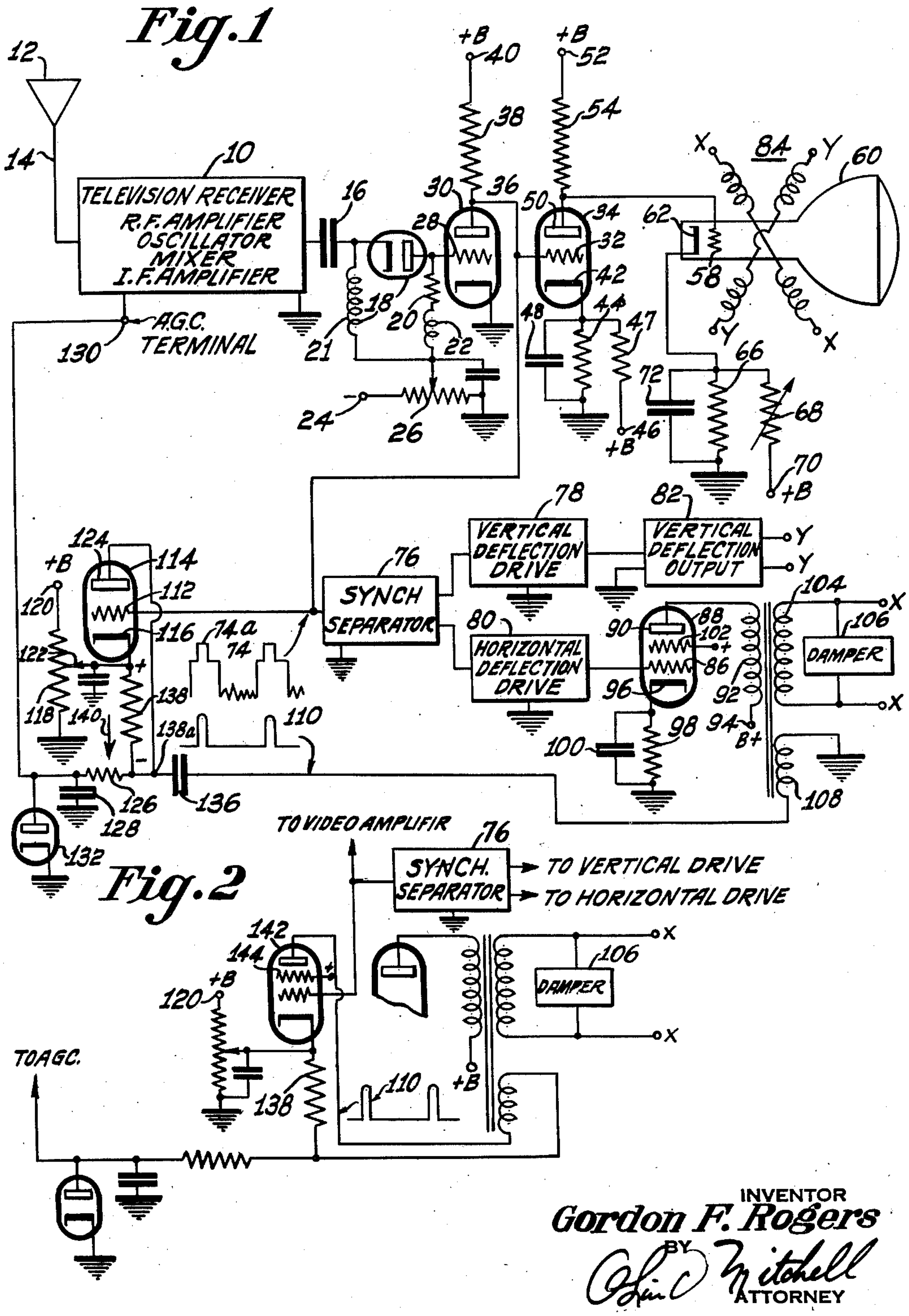
Figure 1 is one embodiment of the present invention as applied to a conventional television receiving circuit.
Figure 2 shows another form of practicing the present invention in connection with the circuit shown in Figure 1.

Referring now to Figure 1, there is indicated in block form 10 certain well-known components of a conventional television receiver including an R. F. ampliper, an oscillator, a first detector or mixer and an intermediate frequency amplifier. Examples of typical arrangements applicable to the functions depicted by block 10 as well as other block representations employed in the drawings hereinafter to be described are given in an article entitled "Television Receivers" by Anthony Wright appearing in the March 1947 issue of RCA Review. The signals are picked up by antenna 12 and through the medium of transmission line 14 are applied to the input of the receiver as shown. The intermediate frequency signal is then coupled through capacitor 16 across inductance 21 to the diode demodulator 18 having a load circuit comprising resistor 20 in series with inductance 22, connected with a source of negative potential 24 through the medium of potentiometer 26. The negative potential thereby applied to the diode circuit acts only as bias for the control electrode 28 of the first video amplifier 30. This arrangement of the diode circuit in turn affords a D. C. connection from the demodulator 18 to the amplifier tube 30. The output of the video amplifier 30 is then D. C. connected to the control grid 32 of the second video amplifier stage represented by vacuum tube 34. Since the anode 36 of vacuum tube 30 is connected through load resistor 38 to a source of positive potential 40, proper operating bias for the vacuum tube 34 is obtained by establishing the cathode 42 at some positive potential with respect to the control electrode 32. This is accomplished by means of cathode resistor 44 connected with a source of positive potential 46 through bleeder resistor 47, the capacitor 48 acting to establish the cathode 42 at substantially A. C. ground potential.

Accordingly, the anode 50 of the vacuum tube 34 receives its positive operating potential from positive power supply terminal 52 through load resistor 54. In a conventional manner the grid 58 of cathode ray reproducing device 60 is D. C. connected with the anode 50. Again in order to establish proper operating bias for the grid 58, the cathode 62 of the cathode ray tube is established at some positive potential with respect to the control electrode 58. This also is accomplished by a series cathode resistor 66 in conjunction with a bleeder resistor 68 connected with a source of positive potential 70. A suitable bypass condenser 72 is placed in shunt with the series cathode resistor 66. For the sake of illustrative simplicity, no frequency compensatory networks have been illustrated in the video amplifier stages.

The video signal 74 appearing at the output of the first amplifier 30 is then applied to the input of a sync separator represented by block 76. This separator circuit effects separation of the vertical and synchronizing pulses and respectively applies them to the vertical and horizontal deflection drive generators 78 and 80. The output of vertical deflection drive generator is then conventionally applied to the vertical deflection output stage 82 having output terminals Y—Y for connection with the vertical deflection winding Y—Y of the deflection yoke 84 associated with the reproducing tube 60. Accordingly, the output of the horizontal deflection drive generator 80 is applied to the control grid 86 of the horizontal deflection output tube 88. The anode 90 of the vacuum tube 88 is supplied with biasing potential through the deflection signal output transformer primary winding 92 from a B+ power supply terminal 94. The cathode 96 of the horizontal output tube 88 is connected with ground through cathode biasing resistor 98, in turn shunted by by-pass capacitor 100. The screen grid 102 is indicated as being supplied by a suitable positive potential. The secondary 104 of the output transformer is shown as adapted for connection at X—X with the terminals X—X of the yoke 84 horizontal deflection winding. A suitable damping circuit 106 is placed across the yoke winding to ensure proper waveform of the current variations in the deflection winding. An auxiliary secondary winding 108 having one terminal connected with ground is also shown on the horizontal output transformer to provide a source of positively extending pulses of the type shown at 110. During proper synchronous operation of the television receiver, these pulses 110, corresponding to the return trace of the horizontal deflection cycle, will necessarily be in synchronism with the received synchronizing pulses 74a of the signal 74.

According to the present invention, the signal 74 is also applied to the grid 112 of the AGC vacuum tube 114 which has its cathode 116 connected with ground potential through a portion of the bleeder potentiometer 118. Since the potentiometer 118 has its upper end connected with a source of positive potential 120, adjustment of the tap 122 on the potentiometer will provide means for adjusting the positive potential of the cathode 116 with respect to ground. The anode 124 of the vacuum tube 114 is connected through filter network comprising resistor 126 and capacitor 128 to the AGC terminal 130 of the television receiver 10. A diode 132 may be connected as shown from the AGC terminal 130 to ground in order to prevent the AGC terminal from assuming a positive potential with respect to ground. The keying pulses 110 derived from the auxiliary winding 108 on the horizontal output transformer are then applied through coupling capacitor 136 to the anode 124 of the vacuum tube 114. The amplitude of these pulses are adjusted to exhibit excursions positively in excess of potential at the cathode 116 so that during the reception of a signal sufficiently in excess of the established threshold of the AGC system, so conduction in the vacuum tube 114 will be established at intervals corresponding to timing of the pulses 110.

The method of adjustment and operation of the AGC system will now be considered. By means of potentiometer 118 the potential of cathode 116 will be so that under conditions of no signal the vacuum tube 114 will develop some average anode current as a result of the rectification of pulses 110. It will also be appreciated that under conditions of no signal the plate current of the video amplifier tube 30 will be at its maximum since no rectified signal is present to establish the grid 38 negatively in excess of the fixed bias applied through the potentiometer 26. This means that the anode 36 of video amplifier 30 and the control grid 112 of the vacuum tube 114 will exhibit their least positive potential with respect to ground during conditions of no signal. Hence, upon reception of a signal, the potential of the first video amplifier anode 30, and consequently the grid 112 of the vacuum tube 114, will increase in a positive direction tending to increase the average value of anode current in the vacuum tube 114. If the received signal strength is of sufficient intensity, the average increased voltage drop across resistor 138 will change the potential of the point 138a, from positive to negative with respect to ground, and hence apply a negative potential to the AGC terminal 130. Manifestly the diode 132 will then no longer have reason to conduct. The value of received signal necessary to discontinue conduction in diode 132 may be thought of as the "threshold" level of the system, which level is of course controllable by the potentiometer 118. This value of no signal anode current passing through the load resistance 138 may cause insufficient voltage drop thereacross to render the net voltage applied to the filter 126 and 128 negative with respect to ground. Under these conditions the diode 132 will establish conduction to maintain the AGC terminal at ground potential with the necessary voltage drop occurring across filter resistor 126.

Since the pulses 110 are in synchronism with the received synchronizing pulses 74a, it is apparent that the tube 114 will be rendered conductive only during synchronizing signal peaks of the received signal. Since these peaks represent a constant percentage of carrier modulation, their demodulated amplitude is a measure of received signal strength. Thus, should the received signal decrease in intensity, the instantaneous potential on the control electrode 112 during the rectification of the pulses 110 will be less positive and cause the rectified current through resistor 138 to suffer reduction. Hence, the lower terminal 138a of the load resistor will become less negative with respect to cathode 116 which in effect establishes the AGC terminal 130 at potential less negative with respect to ground. This increases the gain of the receiver to compensate for the reduction in the signal appearing at the grid 112. Correspondingly, an increase in signal strength will increase the current flow through resistor 138 and cause the AGC terminal 130 to become more negative with respect to ground thus decreasing the television receiver gain to correct for the increase in signal. The pulsating nature of the D. C. voltage developed across the resistor 138 follows as a result of rectification of the recurrent pulses 110. Hence, the time constant of the filter comprising resistor 126 and condenser 128 is such as to effectively smooth out these fluctuations to supply the terminal 130 with a substantially ripple-free AGC potential.

Manifestly with the arrangement shown in Figure 1, under conditions of no signal, virtually no voltage will be developed across the resistor 138 and hence the potential applied to the AGC terminal 130 will tend to be that of the cathode 116 which, of course, is positive with respect to ground. In most instances, it will not be desirable to apply a positive voltage to the AGC terminal 130 and hence the diode 132 shown connected with terminal 130 will act to prevent a rise of the terminal 130 positively above ground.

The embodiment of the present invention shown in Figure 2 is substantially the same as that shown in Figure 1. In Figure 2, however, the triode vacuum tube 114 of Figure 1 has been replaced by a multigrid tube such as 142 in Figure 2, having a screen grid 144 connected with a source of positive potential to allow the operation of the vacuum tube 142 as a tetrode or pentode. Under these conditions, the plate current of the vacuum tube produced by the applied pulses 110 will be to a great extent relatively independent of small variations of the amplitude of these pulses. This consideration may be of particular importance where the horizontal deflection output stage is adapted to function as a pulse step-up power supply for the accelerating anode (not shown) of the cathode ray reproducing tube 60. Such a power supply arrangement is quite commonly found in commercial television receivers of present vintage. Under such conditions, the pulses 110 may vary in amplitude in accordance with cathode ray beam current variations accompanying changes in D. C. picture background level. Also, a tetrode or pentode vacuum tube will have a smaller grid to anode capacity which will tend to decrease the feedback of keying pulse energy into the video amplifier. Furthermore, in Figure 2, the auxiliary winding 108 is shown connected in series with the anode-cathode circuit of the vacuum tube 142 whereas in Figure 1, the winding 108 is shown in shunt with the anode-cathode circuit. The arrangement in Figure 2 obviates the need of coupling capacitor 136 with a consequent reduction in circuit cost over the arrangement shown in Figure 1.

Many variations of the embodiments illustrated in Figures 1 and 2 will naturally occur to those skilled in the art without departing from the spirit and scope of the present invention. For instance, the pulses derived from the horizontal deflection circuit as shown in Figures 1 and 2 are not necessarily derived from an auxiliary winding on the horizontal output transformer but may be derived from other portions of the horizontal deflection circuits or, in fact, may be derived from the vertical deflection circuit. Obviously, keying the AGC vacuum tube at the lower operating frequency of the vertical deflection circuit would necessarily decrease the speed of the AGC connective action and, under normal conditions, would not be as desirable as the arrangements illustrated.

Furthermore, this present invention may be adapted as an AGC system for an A. M. or F. M. receiver. In such an application the pulses 110 could be replaced with 60-cycle power line voltage or even radio frequency from a local oscillator. When so used in this manner the second detector of the receiver would be arranged to deliver positive voltage with respect to ground and would be D. C. connected to the grid of the AGC tube. The advantage of this system for A. M. or F. M. would be the elimination of the need for a negative supply for an amplified AGC system.

From the foregoing, it is seen that the applicant has provided a simple, novel, economical, and compact amplitude responsive circuit finding ready application to keyed AGC systems, particularly of the television variety.

What is claimed is:

In a television receiver adapted to receive a television signal including a recurrent pulse component, a circuit to obtain an automatic gain control potential comprising a unilateral conduction device having a cathode, a control electrode and an anode, a source of keying pulses positive with respect to ground and bearing a synchronous relationship to the recurrent pulse component of said television signal, means to apply to the control electrode of said unilateral conduction device television signals with such polarity that an increase in signal strength tends to increase the electron flow in said unilateral conduction device, means to apply to the cathode of said unilateral conduction device a positive biasing potential to prevent said unilateral conduction device from conducting outside the occurrence of said keying pulses, a resistor connected between said anode and said cathode to provide a direct current path therebetween, means to apply said keying pulses to the anode of said unilateral conduction device as the sole energization potential applied to said anode, the keying pulses being of sufficient magnitude to cause in said unilateral conducting device a flow of electrons whose intensity is a function of the strength of the television signals applied to the control electrode of said unilateral conduction device, a storage capacitor effectively connected between said anode and ground to store said electrons, a resistance in parallel with said capacitor as a discharge path for said stored electrons, and a connection from the ungrounded side of said capacitor to said receiver to control the gain thereof.

GORDON F. ROGERS.

REFERENCES CITED

The following references are of record in the file of this patent:

UNITED STATES PATENTS

| Number | Name | Date |
|---|---|---|
| 2,227,056 | Blumlein et al. | Dec. 31, 1940 |
| 2,244,240 | Blumlein | June 3, 1941 |
| 2,303,909 | Blumlein | Dec. 1, 1942 |
| 2,307,218 | Hardwick | Jan. 5, 1943 |
| 2,307,375 | Blumlein et al. | Jan. 5, 1943 |

FOREIGN PATENTS

| Number | Country | Date |
|---|---|---|
| 845,897 | France | Sept. 4, 1939 |
| 848,207 | France | Oct. 25, 1939 |
| 873,623 | France | July 15, 1944 |

OTHER REFERENCES

Automatic Gain Controls for Television Receivers, Wendt & Schroeder, RCA Review, September 1948, vol. IX, #3.